US010135730B2

United States Patent
Chou

(10) Patent No.: US 10,135,730 B2
(45) Date of Patent: Nov. 20, 2018

(54) METHODS, APPARATUSES, AND SYSTEMS FOR RETRIEVING DATA FROM A WIRELESS LOCAL AREA NETWORK (WLAN) ACCESS POINT

(71) Applicant: Intel IP Corporation, Santa Clara, CA (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/779,548

(22) PCT Filed: Mar. 25, 2014

(86) PCT No.: PCT/US2014/031767
§ 371 (c)(1),
(2) Date: Sep. 23, 2015

(87) PCT Pub. No.: WO2014/186055
PCT Pub. Date: Nov. 20, 2014

(65) Prior Publication Data
US 2016/0044660 A1  Feb. 11, 2016

Related U.S. Application Data

(60) Provisional application No. 61/824,338, filed on May 16, 2013.

(51) Int. Cl.
*H04L 12/741* (2013.01)
*H04W 72/04* (2009.01)
(Continued)

(52) U.S. Cl.
CPC ............ *H04L 45/74* (2013.01); *G01C 21/005* (2013.01); *G01S 19/12* (2013.01);
(Continued)

(58) Field of Classification Search
USPC ........................................................ 370/338
See application file for complete search history.

(56) References Cited

U.S. PATENT DOCUMENTS

| 6,697,970 B1 | 2/2004 | Chisholm |
| 9,413,615 B1 | 8/2016 | Singh et al. |

(Continued)

FOREIGN PATENT DOCUMENTS

| CN | 102857971 A | 1/2013 |
| CN | 105340221 A | 2/2016 |

(Continued)

OTHER PUBLICATIONS

3GPP,3rd Generation Partnership Project;Technical Specification Group Services and System Aspects; Telecommunication management;Principles and high level requirements (Release 9), Sep. 2009, 3GPP, release 9, p. 18.*

(Continued)

*Primary Examiner* — Kouroush Mohebbi
(74) *Attorney, Agent, or Firm* — Schwabe, Williamson & Wyatt, P.C.

(57) ABSTRACT

Methods, apparatuses, and systems are described related to retrieving data from a wireless local area network (WLAN) access point (AP). In embodiments, an element manager may include an integration reference point (IRP) agent to receive data from the WLAN AP in the first format. Mapping circuitry of the element manager may convert the data from the first format to a second format to be used by an IRP manager that manages a Long Term Evolution Advance (LTE-A) network. The IRP agent may send the data to the IRP manager in the second format. The data may include, for example, performance monitoring data such as a value of one or more counters and/or a status of one or more alarms maintained by the WLAN AP. Accordingly, one or more (Continued)

components of the LTE-A network may monitor the performance of the WLAN AP.

19 Claims, 4 Drawing Sheets

(51) Int. Cl.
  *H04W 4/02* (2018.01)
  *H04L 12/64* (2006.01)
  *G01C 21/00* (2006.01)
  *G01S 19/12* (2010.01)
  *H04W 28/02* (2009.01)
  *H04W 84/12* (2009.01)
  *H04W 88/06* (2009.01)
  *H04W 16/18* (2009.01)
(52) U.S. Cl.
  CPC ......... *H04L 12/6418* (2013.01); *H04W 4/02* (2013.01); *H04W 28/0252* (2013.01); *H04W 72/0433* (2013.01); *H04W 72/0453* (2013.01); *H04W 16/18* (2013.01); *H04W 84/12* (2013.01); *H04W 88/06* (2013.01)

(56) References Cited

U.S. PATENT DOCUMENTS

| | | | |
|---|---|---|---|
| 2005/0002407 | A1 | 1/2005 | Shaheen et al. |
| 2005/0108558 | A1 | 5/2005 | Hanebutte |
| 2007/0174449 | A1 | 7/2007 | Gupta |
| 2008/0253314 | A1 | 10/2008 | Stephenson et al. |
| 2009/0254606 | A1 | 10/2009 | Power et al. |
| 2010/0087189 | A1 | 4/2010 | Shaheen et al. |
| 2010/0141421 | A1 | 6/2010 | Lagnelov et al. |
| 2011/0010654 | A1 | 1/2011 | Raymond et al. |
| 2011/0280157 | A1 | 11/2011 | Suerbaum |
| 2012/0059923 | A1 | 3/2012 | Cleary et al. |
| 2012/0287773 | A1 | 11/2012 | Zang et al. |
| 2013/0088983 | A1 | 4/2013 | Pragada et al. |
| 2013/0242783 | A1* | 9/2013 | Horn ............... H04W 24/10 370/252 |
| 2014/0092742 | A1 | 4/2014 | Chou |
| 2014/0105060 | A1 | 4/2014 | Baillargeon |
| 2015/0257024 | A1* | 9/2015 | Baid ............... H04W 24/10 370/338 |
| 2016/0044660 | A1 | 2/2016 | Chou |
| 2016/0092537 | A1 | 3/2016 | Vieira et al. |
| 2016/0105809 | A1 | 4/2016 | Chou |
| 2017/0041827 | A1* | 2/2017 | Chou ............... H04W 4/70 |

FOREIGN PATENT DOCUMENTS

| | | |
|---|---|---|
| EP | 2997696 A1 | 3/2016 |
| KR | 20120048932 A | 5/2012 |
| RU | 2138129 C1 | 9/1999 |
| TW | 201707501 A | 2/2017 |
| WO | 2011073499 A1 | 6/2011 |
| WO | 2012062373 A1 | 5/2012 |
| WO | WO 2013/067464 A1 | 5/2013 |
| WO | 2013095990 A1 | 6/2013 |
| WO | 2014/052129 A1 | 4/2014 |
| WO | 2016/057101 A1 | 4/2016 |

OTHER PUBLICATIONS

International Preliminary Report on Patentability dated Nov. 26, 2015 from International Application No. PCT/US2014/031767.
Office Action dated Nov. 26, 2015 from Taiwan Patent Application No. 103115176.
International Search Report and Written Opinion dated Aug. 14, 2014 from International Application No. PCT/US2014/031767.
3GPP, "Technical Specification Group Services and System Aspects; Telecommunication management; Principles and high level requirements (Release 11)," 3GPP TS 32.101 V11.1.0 (Dec. 2012), Dec. 12, 2012, Lte Advanced, 67 pages.
Intel, "Text proposal to WLAN management TR," 3GPP TSG (Telecom Management) Meeting #84, S5-121724; Agenda Item: 6.8.1—TR on WLAN impacts to Type-2 management (560036); Aug. 20-24, 2012; Berlin, Germany; 4 pages.
Taiwan Patent Office; First Office Action dated Jul. 21, 2015 from Patent Application No. 103115176; 31 pages.
3GPP, "Technicial Specification Group Services and System Aspects; Telecommunication management; Fault Management; Part 2: Alarm Integration Reference Point (IRP); Information Service (IS) (Release 10)," 3GPP TS32.111-2 V10.1.0 (Mar. 2011), Lte Advanced, 64 pages.
3GPP, "Technical Specification Group Services and Systems Aspects; Telecommunication management; Study on Wireless Local Area Network (WLAN) management (Release 12)," 3GPP TR32.841 V12.0.0 (Sep. 2014), Ltd Advanced, 13 pages.
Taiwan Patent Office; Office Action dated Aug. 18, 2016 from Application No. 104129203, 16 pages.
3GPP, "Technical Specification Group Services and System Aspects; Telecommunication Management; Fault Management; Part 2: Alarm Integration Reference Point (IRP), Information Service (IS) (Release 12)," TS 32.111-2 V12.0.0 (Oct. 2014); 68 pages.
3GPP, "Technical Specification Group Services and System Aspects; Telecommunication Management; Study on Wireless Local Area Network (WLAN) Management (Release 12)," TR 32.841 V12.0.0 (Sep. 2014); 13 pages.
Intel, "Discussion paper of IRP selection study," Document for discussion and approval; 6.8.1—TR on WLAN impacts to Type-2 management (560036); 3GPP TSG SA WG5 (Telecom management) Meeting #91; Oct. 14-18, 2013; Shenzhen, P.R. China; S5-131607; 3 pages.
International Search Report and Written Opinion for PCT/US2015/042068 dated Oct. 9, 2015; 12 pages.
3GPP, "Generic Network Resource Model (NRM) Integration Reference Point (IRP); Information Service (IS) (Release 11)," 3GPP TS 28.622 V11.0.0 (Dec. 2012), Dec. 21, 2012, Lte Advanced, 22 pages.
3GPP, "Wireless Local Area Network (WLAN) Management Network Resources Model (NRM) Integration Reference Point (IRP); Information Service (IS) (Release 12)," 3GPP TS 28.682 V0.0.0 (Nov. 2013), Jan. 14, 2014, lte Advanced, 8 pages.
3GPP, "Configuration Management (CM); Generic network resources Integration Reference Point (IRP); Network Resource Model (NRM) (Release 11)," 3GPP TS 32.622 V11.1.0 (Jun. 2013), Jun. 28, 2013, Lte Advanced, 29 pages.
McCloghrie et al., "The Interfaces Group MIB," Network Working Group, Category: Request for Comments: 2863, Obsoletes: 2233, Category: Standards Track, Jun. 2000, 69 pages.
Chisholm et al., "Alarm Management Information Base (MIB)," Network Working Group, Category: Request for Comments: 3877, Category: Standards Track, Sep. 2004, 75 pages.
3GPP, "Study on Wireless Local Area Network (WLAN) management (Release 12)," 3GPP TR 32.841 V12.0.0 (Sep. 2014), Sep. 29, 2014, Lte Advanced, 12 pages.
3GPP, "Wireless Local Area Network (WLAN) Management Concepts and requirements (Release 12)," 3GPP TS 28.680 V0.2.0 (May 2014), Jun. 27, 2014, Lte Advanced, 8 pages.
Search Report dated Aug. 15, 2017 from Taiwan Divisional Application No. 105144235, 3 pages.
Office Action dated Jan. 23, 2017 from U.S. Appl. No. 14/668,663, 37 pages.
Final Office Action dated Jun. 19, 2017 from U.S. Appl. No. 14/668,663, 32 pages.
Ericsson, "Use Alarm IRP for WLAN FM," 3GPP TSG SA WG4 (Telecom Management), Meeting 90, S5-131285, Aug. 26-30, 2013, Valencia, Spain, 3 pages.
Office Action dated Aug. 22, 2017 from Japanese Patent Application No. 2016-511737, 6 pages.
Russian Patent Office—Office Action dated Mar. 23, 2018 from Russian Patent Application No. 2017107800, 10 pages.

(56) References Cited

OTHER PUBLICATIONS

Japanese Patent Office—Office Action dated Apr. 17, 2018 from Japanese Patent Application No. 2017-516902, 16 pages.
3GPP, "TR 32.841 Study on WLAN management, Version 2.0.0," 3GPP TSG SA Meeting #65, TD SP-140548, Agenda Item: 12.50, Sep. 15-17, 2014, Edinburgh, Scotland, 3GPP TSG SA WG5 (Telecom Management) Meeting #96, S5-144434, Aug. 18-22, 2014, Sophia Antipolis, France, 3GPP TR 32.841 V2.0.0 (Sep. 2014), Telecommunication management, Study on WLAN management (Release 12), 14 pages.
Office Action dated Dec. 6, 2016 from Japanese Patent Application No. 2016-511737, 6 pages.
Extended European Search Report dated Dec. 13, 2016 from European Patent Application No. 14797776.3, 9 pages.
3GPP, "Technical Specification Group Services and System Aspects; Telecommunication management; Study on WLAN Management (Release 12)," 3GPP TR 32.841 V0.4.0 (May 2013), May 14, 2013, Lte Advanced, 11 pages.
Intel, "pCR WLAN management mapping function," 3GPP TSG SA WG5 (Telecom Management) Meeting #88, S5-130793, Agenda Item: 6.8.1, Apr. 15-19, 2013, Qingdao, China, 3 pages.
Taiwan Patent Office—Office Action dated Mar. 21, 2018 from Taiwan Divisional Application No. 105115804, 10 pages.
3GPP, "Technical Specification Group Services and System Aspects; Telecommunication management; Performance Management (PM); Concept and requirements (Release 11)," 3GPP TS 32.401 V11.0.0 (Sep. 2012), Lte Advanced, 29 pages.

* cited by examiner

METHODS, APPARATUSES, AND SYSTEMS FOR RETRIEVING DATA FROM A WIRELESS LOCAL AREA NETWORK (WLAN) ACCESS POINT

CROSS REFERENCE TO RELATED APPLICATIONS

The present application is a national phase entry under 35 U.S.C. § 371 of International Application No. PCT/US2014/031767, filed Mar. 25, 2014, entitled "METHODS, APPARATUSES, AND SYSTEMS FOR RETRIEVING DATA FROM A WIRELESS LOCAL AREA NETWORK (WLAN) ACCESS POINT", which claims priority to U.S. Provisional Patent Application No. 61/824,338, filed May 16, 2013, and entitled "ADVANCED WIRELESS COMMUNICATION SYSTEMS AND TECHNIQUES," the entire disclosures of which are hereby incorporated by reference in their entireties.

FIELD

Embodiments of the present invention relate generally to wireless networks and more particularly to retrieving data from a wireless local area network (WLAN) access point.

BACKGROUND

User equipments (UEs) may communicate over a plurality of communication networks, including a wireless cellular network, such as a Long Term Evolution Advanced (LTE-A) network, and a wireless local area network (WLAN). The UEs may communicate with an evolved Node B (eNB) of the LTE-A network to access network services on the LTE-A network, and may communicate with a WLAN access point (AP) to access network services on the WLAN. The LTE-A network may prefer for the UEs to connect to the WLAN when in range of the WLAN AP to lessen the load on the LTE-A network. However, the LTE-A network is unable to retrieve performance monitoring data or the status of alarms maintained by the WLAN AP to monitor the quality of service offered by the WLAN AP for the UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for retrieving data from a wireless local area network (WLAN) access point (AP) in a wireless communication system.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "NB" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
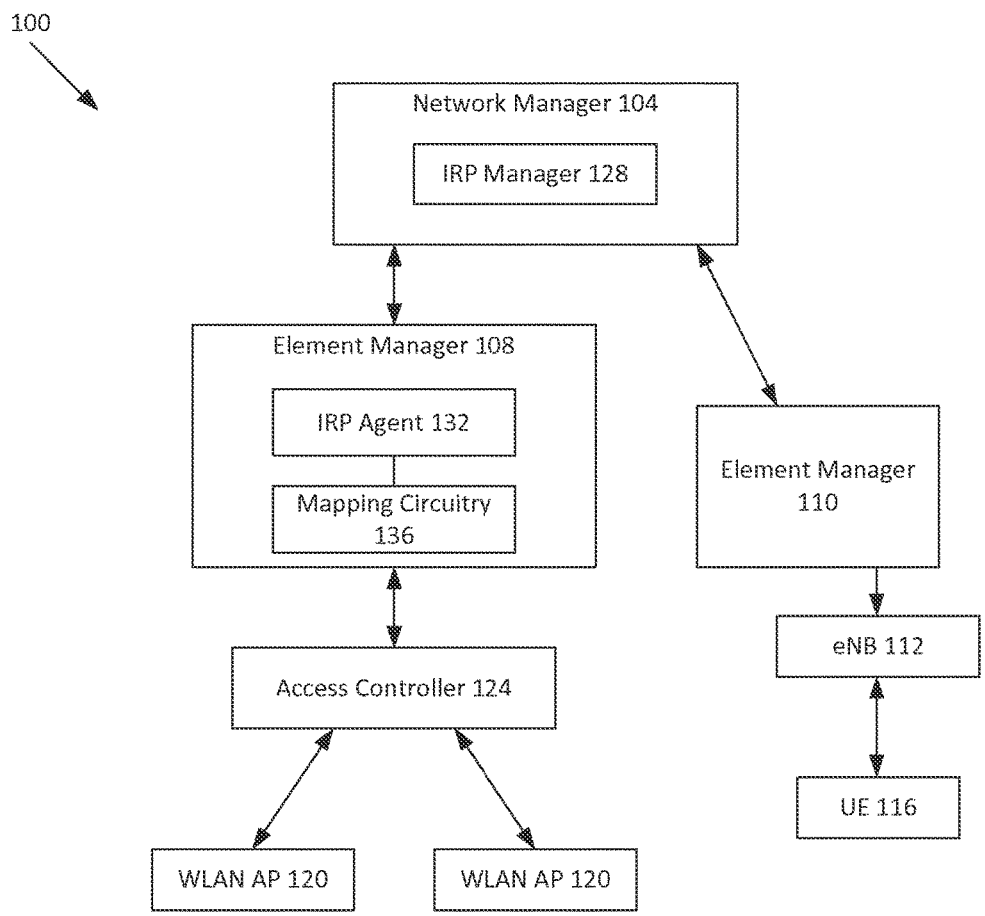
FIG. 1 schematically illustrates a high-level example of a network environment comprising a network manager, element managers, an access controller, one or more wireless local area network (WLAN) access points (APs), an evolved Node B (eNB), and a user equipment (UE), in accordance with various embodiments.

FIG. 1 schematically illustrates a network environment 100 in accordance with various embodiments. The network environment 100 includes a network manager 104 communicatively coupled with an element manager 108 and an element manager 110. The element manager 110 may manage one or more evolved Node Bs (eNBs), including eNB 112. The network manager 104 may manage a plurality of element managers including the element manager 108 and element manager 110. The network manager 104, element manager 108, element manager 110, and eNB 112 may be part of a radio access network (RAN), such as a 3GPP LTE Advanced (LTE-A) network. The RAN may be referred to as an evolved universal terrestrial radio access network (EUTRAN). In other embodiments, other radio access network technologies may be utilized.

The eNB 112 may be wirelessly coupled with one or more user equipments (UEs), including UE 116, to provide network services for the UEs via the LTE-A network.

In various embodiments, the network environment 100 may further include one or more WLAN APs 120. One or more of the WLAN APs 120 may be communicatively coupled with the UE 116 to provide network services for the UE 116 via a WLAN (e.g., using a Wi-Fi interface).

In various embodiments, the WLAN APs 120 may be communicatively coupled with the element manager 108. In some embodiments, the network environment 100 may further include an access controller 124 to manage one or more WLAN APs 120. In these embodiments, the element manager 108 may communicate with the one or more WLAN APs 120 via the access controller 124. Other embodiments may not include the access controller 124. In these embodiments, the element manager 108 may communicate directly with the WLAN APs 120.

In various embodiments, the network manager 104 may include an integration reference point (IRP) manager 128 to manage a plurality of element managers, including element manager 108, of the LTE-A network. The IRP manager 128 may communicate with the element manager 108 via a wired and/or wireless interface (e.g., via a Type-2 interface). In some embodiments, the IRP manager 128 may be included in and/or implemented by a chip, chipset, or other collection of programmed and/or preconfigured circuitry.

In various embodiments, the element manager 108 may include an IRP agent 132 and mapping circuitry 136 coupled to one another. The IRP agent 132 may communicate with the IRP manager 128 of the network manager 104 (e.g., via the Type-2 interface). In some embodiments, the IRP agent 132 and/or mapping circuitry 136 may be included in and/or implemented by a chip, chipset, or other collection of programmed and/or preconfigured circuitry.

In various embodiments, the mapping circuitry 136 may implement a mapping function (also referred to as a WLAN mapping function) to convert data between a first format generated and/or used by the WLAN APs 120 of the WLAN to a second format that is used by the IRP manager 128 of the network manager 104 that manages the LTE-A network. For example, the IRP agent 132 may receive data from the WLAN AP 120, and the mapping circuitry 136 may convert the data from the first format to the second format. The IRP agent 132 may then send the data, in the second format, to the network manager 104 (e.g., to the IRP manager 128 of the network manager 104).

The mapping circuitry 136 may allow the network manager 104 and/or element manager 108 to retrieve data from the WLAN APs 120. The data may be, for example, performance monitoring (PM) data (such as a value of one or more counters maintained by the WLAN AP 120) and/or a status of one or more alarms maintained by the WLAN AP 120. The network manager 104 and/or element manager 108 may use the data from the WLAN APs 120 to manage the LTE-A network. For example, the network manager 104 and/or element manager 108 may choose to maintain a network connection with the UE 116 (e.g., not offload the UE 116 to the WLAN) if the data from the WLAN AP 120 indicates that the WLAN AP 120 has a high UE number of connected UEs, is processing a large amount of network traffic volume, and/or is not functioning properly.

In various embodiments, the WLAN APs 120 may maintain one or more counters (also referred to as PM counters) used to monitor performance of the WLAN APs 120. The one or more counters may include, for example, one or more data volume counters to measure data volume on the WLAN interface. For example, the one or more data volume counters may include an input data volume counter that indicates an amount of data received (e.g., uplink data) by the individual WLAN AP 120 via the WLAN interface. The input data volume counter may include, for example, an ifInOctets counter that tracks the total number of octets received on the WLAN interface, including framing characters.

Additionally, or alternatively, the one or more data volume counters may include an output data volume counter that indicates an amount of data transmitted (e.g., downlink data) by the individual WLAN AP 120 via the WLAN interface. The output data volume counter may include, for example, an ifOutOctets counter that tracks the total number of octets transmitted on the WLAN interface.

In some embodiments, the one or more counters managed by the WLAN APs 120 may additionally or alternatively include an associated UE counter to indicate a number of UEs 116 associated with the individual WLAN AP 120 (e.g., connected to the WLAN AP 120 via the WLAN interface). The associated UE counter may include, for example, a dot11AssociatedStationCount counter that increments when a UE (also referred to as a wireless station in common WLAN terminology) associates or reassociates with the WLAN AP 120 and decrements when a UE disassociates.

In some embodiments, the one or more counters may additionally or alternatively include one or more media access control (MAC) data volume counters to measure the data volume on the MAC layer. For example, the one or more MAC data volume counters may include a dot11TransmittedOctetsInAMPDUCount counter that is incremented by the number of octets in the Aggregated MAC Protocol Data Unit (A-MPDU) frame when an A-MPDU frame is transmitted by the WLAN AP 120 and/or a dot11ReceivedOctetsInAMPDUCount counter that is incremented by the number of octets in the A-MPDU frame when an A-MPDU frame is received by the WLAN AP 120. The MAC data volume counters may be status variables that are written by the MAC layer of the WLAN AP 120 when an A-MPDU is transmitted and/or received.

In various embodiments, the IRP agent 132 of the element manager 108 may transmit a request to one or more of the WLAN APs 120 to request counter data including the current value of one or more counters. The element manager 108 may receive the counter data from the one or more WLAN APs 120 in the first format. The mapping circuitry 136 of the element manager 108 may convert the counter data to the second format and the IRP agent 132 may transmit the counter data to the IRP manager 128 of the network manager 104.

In some embodiments, the IRP agent 132 may transmit the request to the one or more WLAN APs 120 responsive to a request received from the network manager 104. In other embodiments, the IRP agent 132 may proactively send the request to the one or more WLAN APs in anticipation of receiving the request from the network manager 104. In yet other embodiments, the network manager 104 may not send an explicit request for the counter data to the element manager 108 and the element manager 108 may periodically request the counter data from the WLAN APs and report the counter data to the network manager 104.

In some embodiments, the IRP agent 132 may request the counter data from the individual WLAN APs 120 periodically to monitor a change in the value of the one or more counters over time. For example, the IRP agent 132 may periodically request the value of the ifInOctets counter to determine the input data volume per elapsed time. In various embodiments, one or more of the counters may increment from a value of 0 to a maximum value. When the counter reaches the maximum value, a subsequent increment of the counter may cause the counter to "wrap" and start over at 0. Accordingly, the value of the counter must be polled at least once per wrap cycle to get an accurate measurement of the change in the counter value over time.

In various embodiments, the IRP agent 132 may determine a time period between successive requests for the value of the counter based on a size of the counter (e.g., number of bits and/or possible values) and/or a speed with which the counter is incrementing. The speed of the counter may be determined based on a change in the value of the counter over time. The IRP agent 132 may determine the time period between successive requests so that the value of the counter is polled at least once per wrap cycle (e.g., the time period between successive wraps of the counter).

As an example, the ifInOctets counter may be a 32-bit counter in some embodiments. For a 10 Megabit/second (Mbs) data stream of back-to-back, full-size packets may cause the ifInOctets counter to wrap in slightly more than 57 minutes. However, for a 100 Mbs data stream of back-to-back full-size packets, the ifInOctets counter may wrap in about 5.7 minutes. Additionally, for a 1 gigabit/second (Gbs) data stream of back-to-back full-size packets may cause the ifInOctets counter to wrap in about 34 seconds. Accordingly, the maximum time between successive requests for the counter value that is needed to poll the counter value at least once per wrap cycle may vary considerably depending on the data volume processed by the WLAN AP 120.

Accordingly, the IRP agent 132 may determine a time period between successive requests for the value of the counter, based on the size of the counter and/or the speed with which the counter is incrementing, in order to ensure that the value of the counter is polled at least once per wrap cycle of the counter. This may allow the element manager 108 and/or network manager 104 to accurately calculate a change per elapsed time for the parameter tracked by the counter.

In some embodiments, adjusting the time period between successive counter polling requests by the element manager 108 may not be needed for some counters. For example, adjusting the time period between successive counter polling requests may not be needed for the associated UE counter, which increments when a UE associates or reassociates with the WLAN AP 120 and decrements when a UE disassociates from the WLAN AP 120.

As discussed above, the mapping circuitry 136 of the element manager 108 may also allow the network manager 104 to retrieve a status of an alarm that is managed by one of the WLAN APs 120. The alarm may indicate, for example, an operating status of the WLAN AP to indicate if a network connection is available via the WLAN AP 120 (e.g., whether or not the WLAN AP 120 is able to pass data packets). For example, in some embodiments, the alarm may include an ifOperStatus alarm managed by the WLAN AP 120 to indicate the operating status of the WLAN AP 120. Additionally, or alternatively, some IEEE 802.11 counters maintained by the WLAN AP 120 (e.g. dot11FailedCount, dot11RTSFailureCount, dot11ACKFailureCount, dot11FCSErrorCount, dot11DeniedAssociationCounterDueToBSSLoad) may exceed certain thresholds that cause alarms to be generated.

In some embodiments, the IRP agent 132 of the element manager 108 may receive a request from the IRP manager 128 of the network manager 104 for the status of an alarm managed by the WLAN AP 120. The mapping circuitry 136 may map the request into a format that will be understood by the WLAN AP 120, and the IRP agent 132 may send a re-formatted request, for example a Simple Network Management Protocol (SNMP) GET message, to the WLAN AP 120 to request the status of the alarm. The WLAN AP 120 may process the request, retrieve the status of the alarm, and send a message to the IRP agent 132 with the status of the alarm. The mapping circuitry 136 may convert the message with the status of the alarm into a format that will be understood by the IRP agent 132 may transmit a message to the IRP manager 128 with the status of the alarm.

In various embodiments, the network manager 104 may use the data received from the WLAN APs 120 (e.g., the values of one or more counters and/or the status of one or more alarms) to manage communications over the LTE-A network. For example, the network manager 104 may determine that the WLAN AP 120 is overloaded based on a data volume per elapsed time (e.g., based on a change in the value of the ifInOctets counter over time) and/or the number of UEs connected to the WLAN AP 120 (e.g., based on the value of the associated UE counter). Alternatively, the network manager 104 may determine that there is a problem with the WLAN AP 120 if the associated UE counter indicates that no UEs are connected to the WLAN AP 120. Furthermore, the network manager 104 may determine that there is a problem with the WLAN AP 120 based on the status of one or more alarms managed by the WLAN AP 120.

In some embodiments, the eNB 112 may maintain a connection with the UE 116 via the LTE-A network based on a determination that the WLAN AP 120 is overloaded and/or a determination that there is a problem with the WLAN AP 120. Alternatively, the network manager 104 may decide to inform eNB 112, via element manager 110, that one or more UEs 116 may be offloaded onto a specific WLAN AP 120 (e.g., to switch the UE 116 to being connected with the WLAN via the WLAN AP 120 in addition to or instead of being connected to the LTE-A network via the eNB 112) based on a determination that the WLAN AP 120 is operating effectively (e.g., is not overloaded and has a connection to the internet). In some embodiments, the eNB 110 may determine which UEs 116 to offload to the WLAN AP 120 and at what time.

In some embodiments, the network manager 104 may send a notification to an operator of the WLAN in response to the data received from the WLAN APs 120. For example, the network manager 104 may notify the operator of the WLAN if the network manager 104 determines that the WLAN AP 120 may not be functioning properly (e.g., no internet connection is available).

Figure 2:
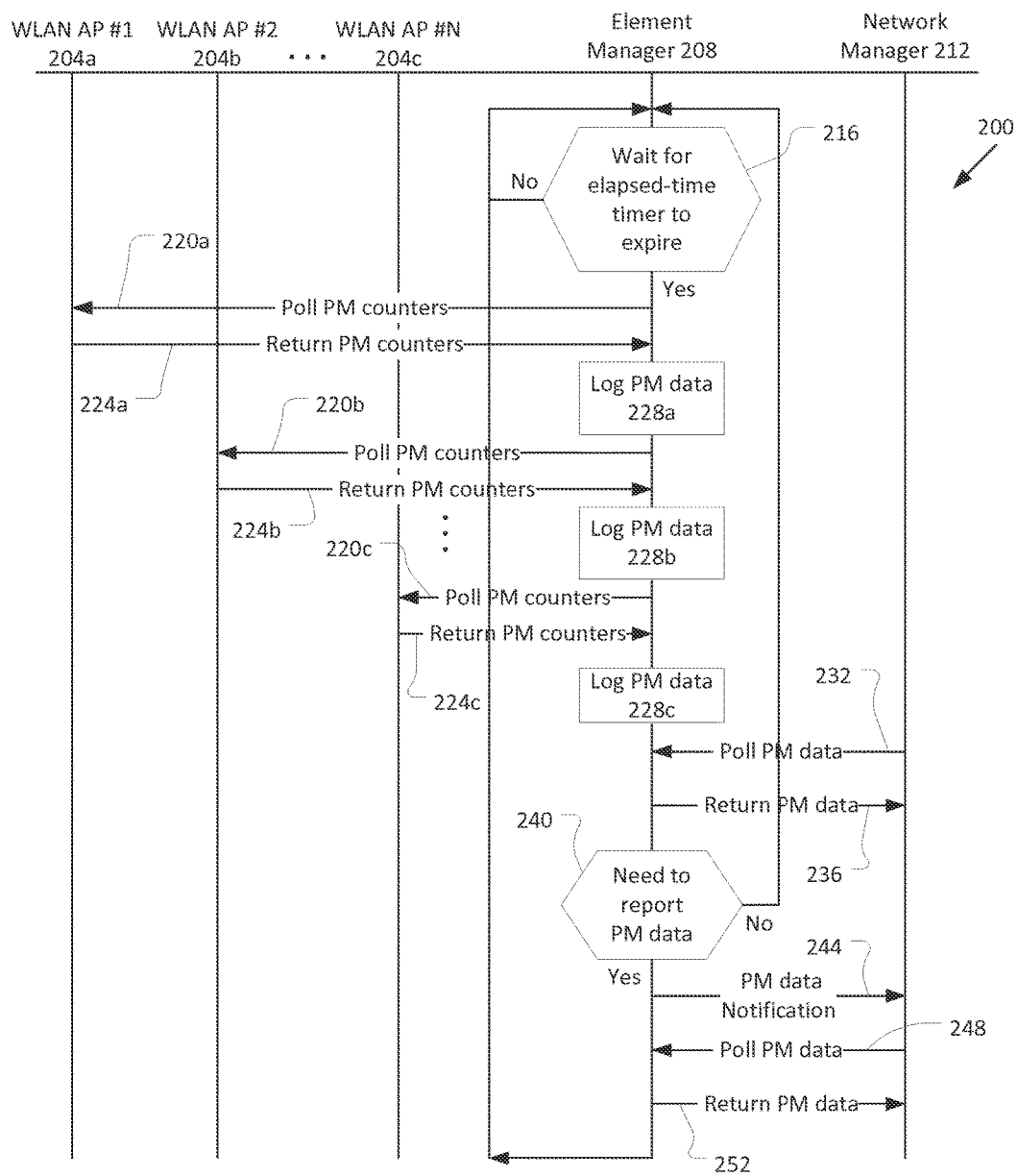
FIG. 2 schematically illustrates a method for polling and reporting data from one or more WLAN APs in accordance with various embodiments.

FIG. 2 illustrates a flow diagram for a method 200 of polling and reporting data from one or more WLAN APs 204a-c (which may be similar to WLAN APs 120) in accordance with various embodiments. The method 200 may be performed by an element manager 208 (which may be similar to element manager 108) in cooperation with the one or more WLAN APs 204a-c and a network manager 212 (which may be similar to network manager 104). In some embodiments, the element manager 208 may include one or more tangible computer-readable media having instructions, stored thereon, that when executed cause the element manager 208 to perform method 200.

At 216 of the method 200, the element manager 208 may wait for an elapsed-time timer to expire. The amount of time between expirations of the elapsed-time timer may be configurable (e.g., by the element manager 208 and/or network manager 212), to adjust the time interval between polling the counters of the individual WLAN APs 204a-c as further discussed elsewhere herein. When the elapsed-time timer expires, the element manager 208 may, at 220a-c of the method 200, send requests to poll one or more performance monitoring (PM) counters to respective WLAN APs 204a-c.

At 224a-c, the WLAN APs 204a-c may send respective responses with PM data including the current value of the one or more PM counters. The one or more PM counters may include, for example, the ifInOctets counter, the ifOutOctets counter, and/or the dot11AssociatedStationCount counter described herein.

At 228a-c of the method 200, the element manager 208 may log the PM data received from the respective WLAN APs 204a-c. The element manager 208 may perform the operations 220a-c, 224a-c, and 228a-c for any suitable number of one or more WLAN APs 204a-c.

At 232 of the method 200, the element manager 208 may receive a request from the network manager 212 to poll the PM data polled from the WLAN APs 204a-c. The element manager 208 may, at 236 of the method 200, send a PM data report to the network manager 212 with the PM data, responsive to the request at 232. The element manager 208 may convert the PM data from a first format received from the WLAN PMs 204a-c to a second format to be used by the network manager 212. The element manager 208 may send the PM data to the network manager 212 in the second format. The element manager 208 may convert the PM data from the first format to the second format before or after logging the PM data at blocks 228a-c.

At 240 of the method 200, the element manager 208 may determine if it is needed to report the PM data to the network manager 212 (e.g., if the element manager 208 did not receive a request for the PM data from the network manager 212 or if additional PM data was received and/or logged by the element manager 208 after the PM data report was transmitted to the network manager 212 at block 236 of the method 200. Alternatively, or additionally, or the network manager 212 may configure the element manager 208 to report PM data at a certain reporting interval.

If it is determined at 240 that there is no need to report the PM data to the network manager 212, the element manager 208 may return to block 216 of the method 200 to wait for the elapsed-time timer to expire again and then send further requests to the WLAN APs 204a-c to poll the PM counters.

If it is determined at 240 that the PM data needs to be reported to the network manager 212, the element manager 208 may, at 244 of the method 200, send a PM data notification to the network manager 212 to notify the network manager 212 that the element manager 208 has logged PM data for retrieval by the network manager 212. Alternatively, the element manager 208 may transmit the PM data report with the PM data to the network manager 212 proactively (e.g., without sending a PM data notification or receiving a polling request from the network manager 212).

The element manager 208 may then, at 248 of the method 200, receive a request from the network manager 212 for the PM data. The element manager 208 may transmit a PM data report with the PM data to the network manager 212 at 252 of the method 200. After sending the PM data report at 252, the element manager 208 may return to block 216 of the method 200.

Accordingly, method 200 may be used to retrieve the PM data (e.g., the values of the PM counters) from the WLAN APs 204a-c and pass the PM data to the network manager 212. The network manager 212 may request the PM data at 232 of the method 200, request the PM data from the element manager 208. Additionally, or alternatively, the element manager 208 may notify the network manager, at 240 of the method 200, that PM data is available for retrieval. In some embodiments, the network manager 212 may not send the request for the PM data at 232 and may instead wait for the notification at 240 before requesting the PM data at 244. Alternatively, the element manager 208 may transmit the PM data report with the PM data to the network manager 212 proactively (e.g., without sending a PM data notification or receiving a polling request from the network manager 212).

Figure 3:
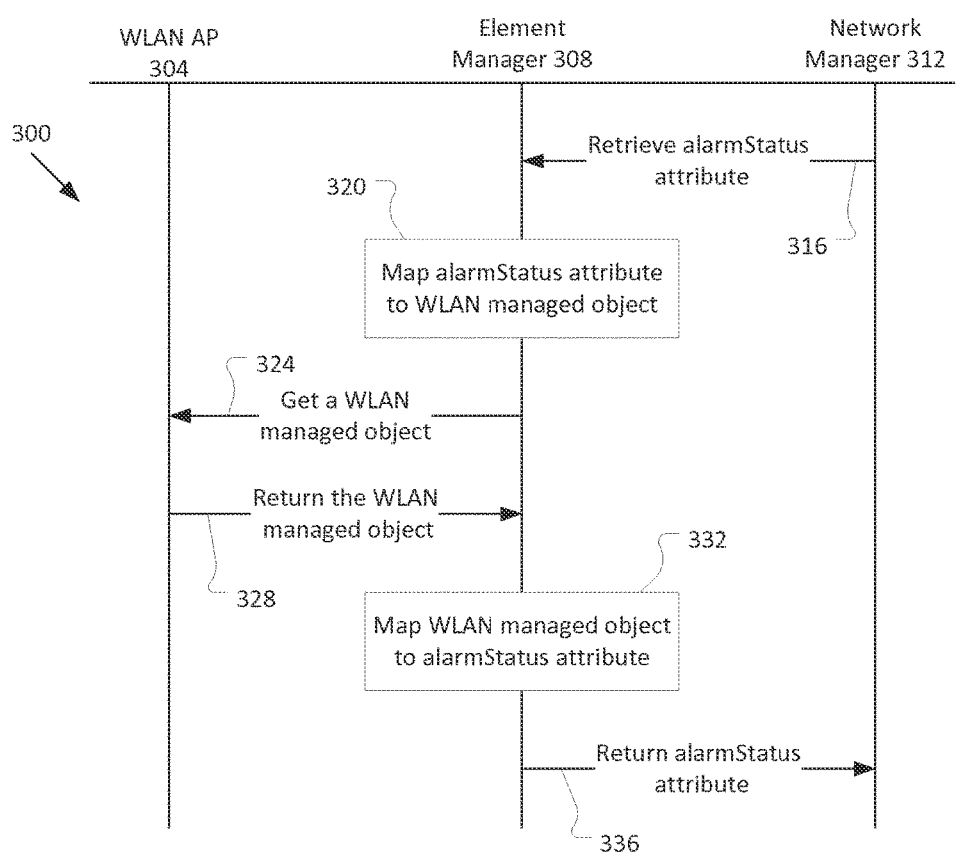
FIG. 3 illustrates a method for retrieving a status of an alarm in accordance with various embodiments.

FIG. 3 illustrates a method 300 for retrieving a status of an alarm from a WLAN AP 304 (which may be similar to the WLAN APs 120), in accordance with various embodiments. The method 300 may be performed by an element manager 308 (which may be similar to element manager 108) in cooperation with the WLAN AP 304 and a network manager 312 (which may be similar to network manager 104). In some embodiments, the element manager 308 may include one or more tangible computer-readable media having instructions, stored thereon, that when executed cause the element manager 308 to perform method 300.

At 316 of the method 300, the element manager 308 may receive a request for an alarm status attribute from the network manager 312. The request for an alarm status attribute may be associated with an alarm managed by the WLAN AP 304.

At 320 of the method 300, the element manager 308 may convert the request for the alarm status attribute into a request for a WLAN managed object that will be understood by the WLAN AP 304. The element manager 308 may, at 324 of the method 300, send the request for the WLAN managed object to the WLAN AP 304. The request for the WLAN managed object may include, for example, a SNMP GET message to retrieve the WLAN managed object.

At 328 of the method 300, the element manager 308 may receive the WLAN managed object from the WLAN AP 304. The WLAN managed object may include, for example, the status of an alarm, such as ifOperStatus.

At 332 of the method 300, the element manager 308 may map the WLAN managed object to an alarm status attribute that will be understood by the network manager 312. At 336 of the method 300, the element manager 308 may transmit the alarm status attribute to the network manager 312.

Figure 4:
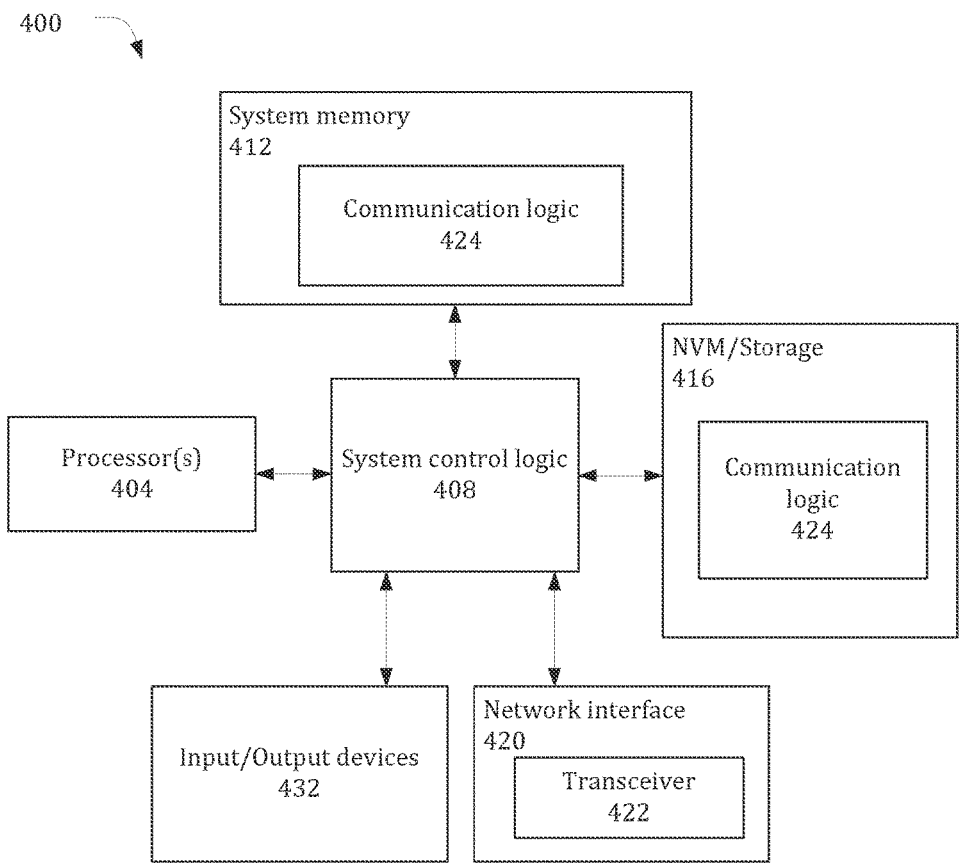
FIG. 4 schematically illustrates an example system that may be used to practice various embodiments described herein.

The network manager 104, element manager 108, element manager 110, eNB 112, UE 116, WLAN APs 120, and/or access controller 124 described herein may be implemented into a system using any suitable hardware and/or software to configure as desired. FIG. 4 illustrates, for one embodiment, an example system 400 comprising one or more processor(s) 404, system control logic 408 coupled with at least one of the processor(s) 404, system memory 412 coupled with system control logic 408, non-volatile memory (NVM)/storage 416 coupled with system control logic 408, a network interface 420 coupled with system control logic 408, and input/output (I/O) devices 432 coupled with system control logic 408.

The processor(s) 404 may include one or more single-core or multi-core processors. The processor(s) 404 may include any combination of general-purpose processors and dedicated processors (e.g., graphics processors, application processors, baseband processors, etc.).

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, e.g., communication logic 424. System memory 412 for one embodiment may include any suitable volatile memory, such as suitable dynamic random access memory (DRAM), for example.

NVM/storage 416 may include one or more tangible, non-transitory computer-readable media used to store data and/or instructions, e.g., communication logic 424. NVM/ storage 416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 416 may include a storage resource physically part of a device on which the system 400 is installed or it may be accessible by, but not necessarily a part of, the device. For example, the NVM/storage 416 may be accessed over a network via the network interface 420 and/or over Input/Output (I/O) devices 432.

The communication logic 424 may include instructions that, when executed by one or more of the processors 404, cause the system 400 to perform operations associated with the components of the communication device IRP manager 128, IRP agent 132, mapping circuitry 136 and/or the methods 200 or 300 as described with respect to the above embodiments. In various embodiments, the communication logic 424 may include hardware, software, and/or firmware components that may or may not be explicitly shown in system 400.

Network interface 420 may have a transceiver 422 to provide a radio interface for system 400 to communicate over one or more network(s) and/or with any other suitable device. In various embodiments, the transceiver 422 may be integrated with other components of system 400. For example, the transceiver 422 may include a processor of the processor(s) 404, memory of the system memory 412, and NVM/Storage of NVM/Storage 416. Network interface 420 may include any suitable hardware and/or firmware. Network interface 420 may include a plurality of antennas to provide a multiple input, multiple output radio interface. Network interface 420 for one embodiment may include, for example, a wired network adapter, a wireless network adapter, a telephone modem, and/or a wireless modem.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, the I/O devices 432 may include user interfaces designed to enable user interaction with the system 400, peripheral component interfaces designed to enable peripheral component interaction with the system 400, and/or sensors designed to determine environmental conditions and/or location information related to the system 400.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 420 to communicate with components of a positioning network, e.g., a global positioning system (GPS) satellite.

In various embodiments, the system 400 may be a mobile computing device such as, but not limited to, a laptop computing device, a tablet computing device, a netbook, a smartphone, etc. In various embodiments, system 400 may have more or less components, and/or different architectures.

Some non-limiting Examples are provided below.

Example 1 is an apparatus, comprising: an element manager to receive data from a wireless local area network (WLAN) access point (AP); and mapping circuitry to convert the data from a first format generated by the WLAN AP to a second format to be used by a network manager that manages a Long Term Evolution Advanced (LTE-A) network; wherein the element manager is to send the data to the network manager in the second format.

Example 2 is the apparatus of Example 1, wherein the network manager is to communicate with one or more evolved Node Bs (eNBs) of the LTE-A network, via another element manager, to manage communications by the one or more eNBs.

Example 3 is the apparatus of Example 1, wherein the element manager is to send a request to the WLAN AP, wherein the data is received in response to the request.

Example 4 is the apparatus of Example 3, wherein the WLAN AP is a first WLAN AP, wherein the element manager is further to: send requests to a plurality of WLAN APs including the first WLAN AP; receive data from the plurality of WLAN APs in response to the requests; receive a request from the network manager; and send the data from the plurality of WLAN APs to the network manager in response to the request from the network manager.

Example 5 is the apparatus of Example 1, wherein the data includes a value of a counter, wherein the element manager is to periodically transmit a request for the data to the WLAN AP, and wherein a time period between successive requests is determined based on a size of the counter.

Example 6 is the apparatus of any one of Examples 1 to 5, wherein the data includes a value of a counter that indicates an amount of data received or an amount of data transmitted by the WLAN AP via a WLAN interface.

Example 7 is the apparatus of any one of Examples 1 to 5, wherein the data includes a value of a counter that indicates a number of user equipments (UEs) associated with the WLAN AP.

Example 8 is the apparatus of any one of Examples 1 to 5, wherein the data includes a status of an alarm managed by the WLAN AP, wherein the element manager is to receive a first request from the IRP manager to query the status of the alarm, wherein the mapping circuitry is to convert the first request to a second request to be used by the WLAN AP, and wherein the element manager is to send the second request to the WLAN AP to retrieve the status of the alarm.

Example 9 is the apparatus of Example 8, wherein the second request is a Simple Network Management Protocol (SNMP) GET message.

Example 10 is a method to be performed by an element manager, comprising: periodically sending a request for a value of a counter to a wireless local area network (WLAN) access point (AP); receiving a first message including the value of the counter from the WLAN AP responsive to the request sending a second message including the value of the counter to a network manager that manages a Long Term Evolution Advanced (LTE-A) network; and determining a time period between sending successive requests to the WLAN AP based on a size of the counter and the received values of the counter.

Example 11 is the method of Example 10, wherein the first message includes a first format and the second message includes a second format that is different from the first format, and wherein the method further includes converting the first message to the second message.

Example 12 is the method of Example 10, wherein the WLAN AP is a first WLAN AP, wherein the method further includes: sending requests to a plurality of WLAN APs including the first WLAN AP; receiving values of respective counters from the plurality of WLAN APs in response to the requests; and sending the values of the respective counters to the network manager.

Example 13 is the method of Example 10, further comprising receiving a request from the network manager for the value of the counter.

Example 14 is the method of any one of Examples 10 to 13, wherein the value of the counter indicates an amount of data received or an amount of data transmitted by the WLAN AP via a WLAN interface.

Example 15 is the method of any one of Examples 10 to 13, wherein the value of the counter indicates a number of user equipments (UEs) associated with the WLAN AP.

Example 16 is the method of Example 10, wherein the first message is received from the WLAN AP via an access controller.

Example 17 is one or more non-transitory computer readable media having instructions, stored thereon, that when executed cause an element manager to: process a first data request from a network manager that manages a Long Term Evolution Advanced (LTE-A) network; transmit a second data request to a wireless local area network (WLAN) access point (AP), the second data request having a different format from the first data request; process data from the WLAN AP received in response to the second data request; and transmit the data to the network manager.

Example 18 is the one or more media of Example 17, wherein the second data request is transmitted responsive to receiving the first data request.

Example 19 is the one or more media of Example 17, wherein the data includes a status of an alarm managed by the WLAN AP.

Example 20 is the one or more media of Example 17, wherein the data includes a value of a counter that indicates an amount of data received or an amount of data transmitted by the WLAN AP via a WLAN interface.

Example 21 is the one or more media of Example 17, wherein the data includes a value of a counter that indicates a number of user equipments (UEs) associated with the WLAN AP.

Example 22 is the one or more media of any one of Examples 17 to 21, wherein the data is received from the WLAN AP via an access controller.

Example 23 is an apparatus to be employed by an element manager, the apparatus including: means to process a first data request from a network manager that manages a Long Term Evolution Advanced (LTE-A) network; means to transmit a second data request to a wireless local area network (WLAN) access point (AP), the second data request having a different format from the first data request; means to process data from the WLAN AP received in response to the second data request; and means to transmit the data to the network manager.

Example 24 is the apparatus of Example 23, wherein the second data request is transmitted responsive to receiving the first data request.

Example 25 is the apparatus of Example 23, wherein the data includes a status of an alarm managed by the WLAN AP.

Example 26 is the apparatus of Example 23, wherein the data includes a value of a counter that indicates an amount of data received or an amount of data transmitted by the WLAN AP via a WLAN interface.

Example 27 is the apparatus of Example 23, wherein the data includes a value of a counter that indicates a number of user equipments (UEs) associated with the WLAN AP.

Example 28 is the apparatus of any one of Examples 23 to 27, wherein the data is received from the WLAN AP via an access controller. Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An element manager, comprising:
    an integration reference point (IRP) agent to interface between a plurality of wireless local area network (WLAN) access points (AP) and a network manager without involvement of a user equipment (UE), wherein the network manager manages a Long Term Evolution Advanced (LTE-A) network, wherein the IRP agent is to receive data from a first WLAN AP of the plurality of WLAN APs, wherein the data includes a value of a counter maintained by the WLAN AP; and
    mapping circuitry to convert the data from a first format generated by the WLAN AP to a second format to be used by the network manager that manages a Long Term Evolution Advanced (LTE-A) network;
    wherein the IRP agent is to send the data to the network manager in the second format via a Type-2 interface; and
    wherein the IRP agent is to periodically transmit a request for the data to the WLAN AP, and wherein a time period between successive requests is determined based on a size of the counter.

2. The element manager of claim 1, wherein the network manager is to communicate with one or more evolved Node Bs (eNBs) of the LTE-A network, via another element manager, to manage communications by the one or more eNBs with one or more UEs, wherein the network manager is to determine whether the one or more UEs should connect with the LTE-A network or the first WLAN AP based on the data sent by the IRP agent.

3. The element manager of claim 1, wherein the IRP agent is further to:
    send requests to the plurality of WLAN APs including the first WLAN AP;
    receive data from the plurality of WLAN APs in response to the requests;
    receive a request from the network manager; and
    send the data from the plurality of WLAN APs to the network manager in response to the request from the network manager.

4. The element manager of claim 1, wherein the value of the counter indicates an amount of data received or an amount of data transmitted by the WLAN AP via a WLAN interface.

5. The element manager of claim 1, wherein the value of the counter indicates a number of UEs associated with the WLAN AP.

6. The element manager of claim 1,
wherein the IRP agent is further to receive a first request from an IRP manager of the network manager to query a status of an alarm,
wherein the mapping circuitry is to convert the first request to a second request to be used by the WLAN AP, and
wherein the IRP agent is to send the second request to the WLAN AP to retrieve the status of the alarm.

7. The element manager of claim 6, wherein the second request is a Simple Network Management Protocol (SNMP) GET message.

8. A method to be performed by an element manager that manages a plurality of network elements, the method comprising:
periodically sending a request for a value of a counter to a wireless local area network (WLAN) access point (AP);
receiving a first message including the value of the counter from the WLAN AP responsive to the request;
sending a second message including the value of the counter to a network manager that manages a Long Term Evolution Advanced (LTE-A) network; and
determining a time period between sending successive periodic requests to the WLAN AP for the value of the counter based on a size of the counter and the received values of the counter.

9. The method of claim 8, wherein the first message includes a first format and the second message includes a second format that is different from the first format, and wherein the method further includes converting the first message to the second message.

10. The method of claim 8, wherein the WLAN AP is a first WLAN AP, wherein the method further includes:
sending requests to a plurality of WLAN APs including the first WLAN AP;
receiving values of respective counters from the plurality of WLAN APs in response to the requests; and
sending the values of the respective counters to the network manager.

11. The method of claim 8, further comprising receiving a request from the network manager for the value of the counter.

12. The method of claim 8, wherein the value of the counter indicates an amount of data received or an amount of data transmitted by the WLAN AP via a WLAN interface.

13. The method of claim 8, wherein the value of the counter indicates a number of user equipments (UEs) associated with the WLAN AP.

14. The method of claim 8, wherein the first message is received from the WLAN AP via an access controller.

15. One or more non-transitory computer readable media having instructions, stored thereon, that when executed cause an element manager that manages a plurality of network elements to:
process a first data request from a network manager that manages a Long Term Evolution Advanced (LTE-A) network;
transmit a second data request to a wireless local area network (WLAN) access point (AP) directly or via a WLAN access controller, the second data request having a different format from the first data request;
process data from the WLAN AP received in response to the second data request, wherein the data includes a value of a counter maintained by the WLAN AP, and wherein the data is received directly from the WLAN AP or via the WLAN access controller;
transmit the data to the network manager via a Type-2 interface; and
periodically repeat the transmission of the second data request to the WLAN AP, wherein a time period between successive transmissions of the second data request is determined based on a size of the counter.

16. The one or more media of claim 15, wherein the second data request is transmitted responsive to receiving the first data request.

17. The one or more media of claim 15, wherein the value of the counter indicates an amount of data received or an amount of data transmitted by the WLAN AP via a WLAN interface.

18. The one or more media of claim 15, wherein the value of the counter indicates a number of user equipments (UEs) associated with the WLAN AP.

19. The one or more media of claim 15, wherein the data is received from the WLAN AP via an access controller.

* * * * *